UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

PROCESS FOR MAKING THIN METALLIC FLAKES.

No. 914,372.  Specification of Letters Patent.  Patented March 2, 1909.

Original application filed March 30, 1905, Serial No. 252,933. Divided and this application filed July 14, 1906. Serial No. 326,237.

*To all whom it may concern:*

Be it known that I, THOMAS ALVA EDISON, a citizen of the United States, residing at Llewellyn Park, Orange, in the county of Essex and State of New Jersey, have invented certain new and useful Improvements in Processes for Making Thin Metallic Flakes, of which the following is a description.

This application is a division of patent, entitled process of making composite metals, No. 827,717, granted Aug. 7, 1906.

My invention relates to the formation of very thin metallic flakes which are suitable for use in forming the active material of my improved storage battery and more particularly to the formation of flakes of this character, which consist of a new product broadly claimed in my Patent No. 850,881 granted April 16, 1907. This is a division of Patent No. 827,717, above referred to. Patent No. 850,881 is entitled composite metal, and in the disclosure thereof two or more metals are physically admixed in such a way that each metal exists as a practically integral sponge-like structure, the cells or pores of either metal being completely filled by the body presented by the other metal, whereby the entire bulk of the composite structure as a whole will be continuously solid throughout. Such a composite metal is characteristically distinguished from any so-called alloy heretofore made, so far as I know, in the respect that it consists of sponge-like interlocking masses, so that it becomes possible by dissolving or otherwise removing one of the metals to obtain a sponge-like integral mass of the other metal, whereas, with ordinary alloys, owing to their intimate molecular admixture, the attempt to dissolve any one of the constituents of the alloy results in the disintegration of the mass. This characteristic peculiarity of my improved composite metal makes it possible to secure very beautiful sponge-like effects in various metals, by first forming the composite metal and then removing one of the metals, and it also becomes possible to secure attractive effects in many arts, where it is desirable that two or more metals should be mechanically associated together.

The primary purpose for which I have used the composite metal referred to is for the production of scales, flakes or foils of nickel and cobalt for admixture with the active material in the negative electrode of my improved storage battery. As I have pointed out in my Patent No. 857,929, granted June 25, 1907, good contact with such active material and between the flakes or foils themselves is secured when metallic cobalt is used, but as I have explained, it is undesirable to use metallic cobalt alone, owing to the fact that its surface becomes oxidized by electrolysis and might in time penetrate the whole mass, and hence it might be advisable to make use of a composite metal of cobalt and nickel. Such a composite metal serves to give excellent contact, and the presence of the nickel therein prevents penetration of oxid within the nickel cobalt to a harmful extent, since the metallic nickel forms a continuous integral connecting sponge, and therefore protects the cobalt from the possibility of inward oxidation to any harmful extent.

To make a composite metal of nickel and cobalt for the purpose of forming scales, films or foils for use in the make-up of my improved battery, I proceed substantially as follows:— A solution of sulfate of nickel and sulfate of cobalt is first obtained in the proper relative quantity to give the resulting product the desired proportions of the two metals. Excellent results have been secured with a composite metal containing 60 per cent. of cobalt and 40 per cent. of nickel, but these proportions may be varied within quite wide limits. The solution of cobalt and nickel sulfates is now added to a potash solution in excess of that necessary to precipitate the two salts and the two solutions thus added are boiled, resulting in the precipitation of hydroxids of nickel and cobalt, which are allowed to settle. The solution is now drawn off and the precipitated mixed hydroxids are washed successively until the mass is free of potash and sulfates. In this way I obtain a physically and intimately mixed mass of hydroxids of the two metals in the desired proportion. The mixed hydroxids are now dried and screened into granules of substantially uniform size, for instance those passing a 30 mesh screen and arrested by a 60 mesh screen, after which the granules are subjected to the reducing action by hydrogen gas in a heated retort to reduce the hydroxids to the respective metals and also to weld together the metallic particles constituting each of the granules, so that each granule will be composed of a combination of the two metals having the characteristics before pointed out. The reduced metallic granules are now subjected to successive rolling operations with oil to convert the composite metal into fine scales or flakes as is common in the art, for example, of making bronze powder. Preferably the flakes are annealed two or more times between the passes of the rolling operation in an inert or non-oxidizing gas, such as hydrogen, at a red heat. After the flakes or foils are formed it is desirable, in order to increase their bulk, to pass them between very fine crimping rolls by which they will be crimped, corrugated or otherwise distorted, or between rolls of very small diameter by which they will be curled or formed into minute spirals. These flakes or foils are added to the active material of the battery in any suitable way, for example, as I have described in my Patents No. 882,144, granted March 17, 1908 and No. 854,200, granted May 21, 1907, wherein the conducting flakes are first assembled and then welded to constitute a sponge-like or honeycomb structure in which the active material is introduced by successively dipping the same into a saturated solution of the active salt and alternate evaporation of the solvent. Or instead, the active particles may be coated with a sticky material such as molasses, and then admixed with the metallic flakes or scales, being then assembled in the pockets, a moderate pressure applied, the molasses being then dissolved out and the final pressure applied, as I describe in my Patent No. 839,371, granted December 25, 1906.

Having now described my invention, what I claim as new therein and desire to secure by Letters Patent is as follows:

1. The process of making very thin metallic flakes, which consists in subjecting metallic granules to successive rolling operations, and annealing the same in a gas which does not react thereupon, between one or more of the passes, substantially as set forth.

2. The process of making very thin metallic flakes which consists in obtaining granules composed of two or more metals each in the form of a substantially integral sponge-like structure, said structures being engaged intimately together to constitute a solid mass, subjecting said metallic granules to successive rolling operations and annealing the same in a gas which does not react thereupon after one or more of the rolling operations, substantially as set forth.

3. The process of making very thin metallic flakes which consists in obtaining granules composed of cobalt and nickel each in the form of a substantially integral sponge-like structure intimately engaging together to form a continuous solid mass, subjecting said granules to successive rolling operations, and annealing the same in a gas which does not react thereupon after one or more of the rolling operations, substantially as set forth.

This specification signed and witnessed this 13th day of July 1906.

THOS. A. EDISON.

Witnesses:
 GRANT L. DYER,
 ANNA R. KLEHM.